(12) United States Patent
Gross et al.

(10) Patent No.: US 7,171,586 B1
(45) Date of Patent: Jan. 30, 2007

(54) METHOD AND APPARATUS FOR IDENTIFYING MECHANISMS RESPONSIBLE FOR "NO-TROUBLE-FOUND" (NTF) EVENTS IN COMPUTER SYSTEMS

(75) Inventors: Kenny C. Gross, San Diego, CA (US); Aleksey M. Urmanov, San Diego, CA (US); Kornelija Zgonc, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 558 days.

(21) Appl. No.: 10/739,827

(22) Filed: Dec. 17, 2003

(51) Int. Cl.
*G06F 11/00* (2006.01)
(52) U.S. Cl. .................... 714/26; 702/183; 714/736
(58) Field of Classification Search ............. 714/26, 714/11, 736; 702/183, 185, 786
See application file for complete search history.

(56) References Cited

U.S. PATENT DOCUMENTS

| | | | |
|---|---|---|---|
| 4,937,763 A | 6/1990 | Mott | 364/550 |
| 5,995,915 A * | 11/1999 | Reed et al. | 702/119 |
| 6,324,665 B1 * | 11/2001 | Fay | 714/736 |
| 2001/0005821 A1 * | 6/2001 | Ottosson | 702/185 |
| 2002/0175697 A1 * | 11/2002 | Miller et al. | 324/765 |

* cited by examiner

*Primary Examiner*—Robert Beausoliel
*Assistant Examiner*—Marc Duncan
(74) *Attorney, Agent, or Firm*—Park, Vaughan & Fleming, LLP

(57) ABSTRACT

One embodiment of the present invention provides a technique for detecting anomalies during operation of a test computer system. Initially, a golden system and the test system are equipped with the same hardware configuration, wherein the golden system has gone through extensive qualification testing and is presumed to be operating correctly. Next, a deterministic load is executed on the golden system, and values for performance parameters from the golden system are monitored while the deterministic load is executing. Similarly, the deterministic load is also executed on the test system, and values for performance parameters from the test system are monitored while the deterministic load is executing. Next, pairwise differences are computed between values for performance parameters received from the test system and values for performance parameters received from the golden system. Finally, change detection techniques are applied to the pairwise differences to detect anomalies during operation of the test system.

21 Claims, 2 Drawing Sheets

METHOD AND APPARATUS FOR IDENTIFYING MECHANISMS RESPONSIBLE FOR "NO-TROUBLE-FOUND" (NTF) EVENTS IN COMPUTER SYSTEMS

BACKGROUND

1. Field of the Invention

The present invention relates to techniques for detecting and diagnosing the causes of anomalies within computer systems. More specifically, the present invention relates to a method and an apparatus that facilitates identifying the mechanisms responsible for "no-trouble-found" (NTF) events in computer systems.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business.

When enterprise computing systems fail, it is often due to an intermittent failure. During such failures, it is common for components, subsystems, or entire servers to indicate they have failed by either "crashing" or otherwise halting processing, with or without writing failure messages to a system log file. "No-Trouble-Found" (NTF) events arise when a service engineer is dispatched to repair a failed server (or the failed server is returned to the manufacturer) and the server runs normally with no indication of a problem. NTF events constitute a huge cost because large components, such as system boards (possibly costing in excess of a hundred thousand of dollars), may need to be replaced. Furthermore, it is embarrassing not to be able to determine the root cause of a problem, and customers are generally happier when a root cause can be determined. This give the customer some assurance that the root cause has been corrected, and is therefore not likely to cause a further disruption in the customer's business.

In high-end computing servers there is an extremely complex interplay of dynamical performance parameters that characterize the state of the system. For example, in high-end servers, these dynamical performance parameters can include system performance parameters, such as parameters having to do with throughput, transaction latencies, queue lengths, load on the CPU and memories, I/O traffic, bus-saturation metrics, and FIFO overflow statistics. They can also include physical parameters, such as distributed internal temperatures, environmental variables, currents, voltages, and time-domain reflectometry readings. They can additionally include "canary variables" associated with synthetic user transactions periodically generated for performance measuring purposes. Although it is possible to sample all of these performance parameters, it is by no means obvious what signal characteristic, "signature," or pattern among multiple performance parameters may accompany or precede NTF events.

Existing systems sometimes place "threshold limits" on specific performance parameters. However, placing a threshold limit on a specific performance parameter does not help in determining a more complex pattern among multiple performance parameters that may be associated with an NTF event. Furthermore, threshold limits are not effective in capturing errors that caused by a stuck sensor, which does not trigger a threshold limit Hence, what is needed is a method and an apparatus that facilitates detecting and diagnosing the causes of anomalies within computer systems based upon patterns in dynamic performance parameters.

SUMMARY

One embodiment of the present invention provides a technique for detecting anomalies during operation of a test computer system. Initially, a golden system and the test system are equipped with the same hardware configuration, wherein the golden system has gone through extensive qualification testing and is presumed to be operating correctly. Next, a deterministic load is executed on the golden system, and values for performance parameters from the golden system are monitored while the deterministic load is executing. Similarly, the deterministic load is also executed on the test system, and values for performance parameters from the test system are monitored while the deterministic load is executing. Next, pairwise differences are computed between values for performance parameters received from the test system and values for performance parameters received from the golden system. Finally, change detection techniques are applied to the pairwise differences to detect anomalies during operation of the test system.

In a variation on this embodiment, detecting the anomalies involves identifying mechanisms responsible for "no-trouble-found" (NTF) events in the test system.

In a variation on this embodiment, the change detection techniques include sequential detection methods. Note that these change detection techniques can include sequential detection methods, such as the Sequential Probability Ratio Test (SPRT).

In a variation on this embodiment, the golden system and the test system reside at the same location, and the deterministic load is synchronized to execute concurrently on the golden system and the test system.

In a variation on this embodiment, values for performance parameters received from the golden system are recorded. In this variation, computing the pairwise differences involves computing pairwise differences between values for performance parameters received from the test system and recorded values for performance parameters received from the golden system.

In a further variation, values for performance parameters received from the test system are also recorded, and computing the pairwise differences involves computing pairwise differences between recorded values for performance parameters received from the test system and recorded values for performance parameters from the golden system.

In a further variation, the golden system and the test system do not reside at the same location.

In a variation on this embodiment, the deterministic load is executed on the golden system first before the deterministic load is executed on the test system.

In a variation on this embodiment, the performance parameters for the test system and the golden system can include: internal performance parameters maintained by software within the test system and the golden system; physical performance parameters measured through sensors located in proximity to the test system and the golden system; and canary performance parameters associated with synthetic user transactions periodically generated for performance measuring purposes.

DETAILED DESCRIPTION

Figure 1:
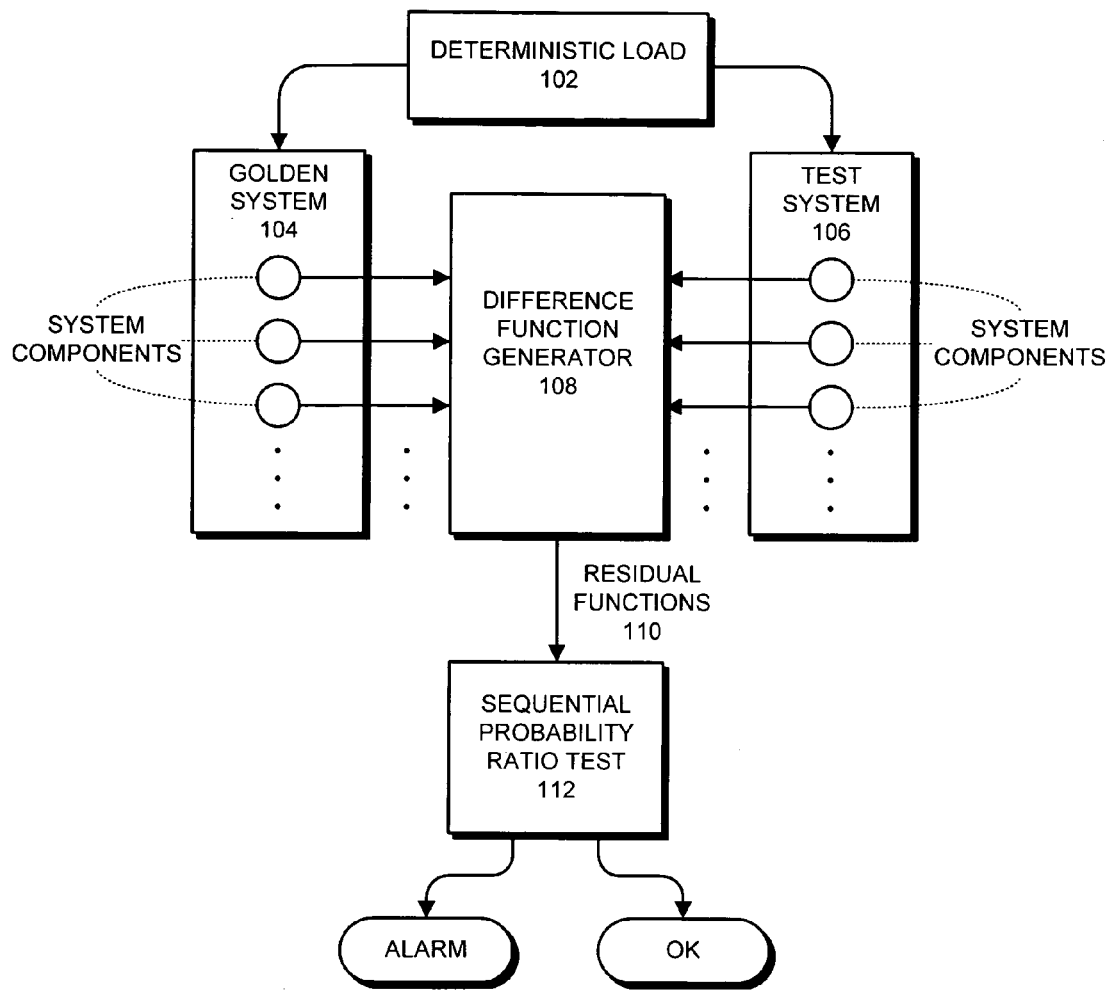
FIG. 1 illustrates a golden system and a test system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Diagnostic Technique

One embodiment of this invention provides an extremely sensitive method for identifying, localizing, and root-causing wide classes of mechanisms responsible for NTF events. One embodiment of the present invention makes use of a Sequential Probability Ratio Test (SPRT). The SPRT is an extremely sensitive binary hypothesis test that can detect very subtle changes in time series signals with a high confidence factor, a high avoidance of "false positives," and a short time-to-detection. In fact, the SPRT method has the shortest mathematically possible time to annunciation for detecting a subtle anomaly in noisy process variables.

Beginning in the 1990's, the SPRT was used for a variety of sensor and equipment operability validation applications in nuclear reactors; but in those applications there were always multiple, redundant sensors for all of the variables under investigation. The invention described herein is a novel technique for adapting a SPRT method to a complex system of computing variables to identify the presence or absence of a mechanism that is believed to be extremely subtle and, if present, is buried in a chaos of dynamically interacting parameters. In short, one may think of this technique as a means of systematically inter-comparing two haystacks, one of which has a needle and one of which does not, with a novel and non-obvious mathematical procedure that maximizes the probability of identifying the needle.

The way the new SPRT Manifold procedure is applied in our invention may be first described for a case wherein the customer's server, which has been experiencing NTF problems, is shipped to a repair center having an identical server that does not exhibit the NTF behavior (the latter server is called the "golden system").

In a first case, we make the SPRT Manifold procedure available to be used by field service personnel so that the NTF localization work can be done in the customer's datacenter. In the first case, we set up the golden system and the test system to have exactly the same hardware configurations (i.e. system boards, IO boards, network interface cards, etc.). We then put a diagnostic exerciser load onto both systems and time the initiation of the load scripts so that the execution is synchronized between the two machines.

We also install a continuous system telemetry harness on both machines. Note this telemetry harness can potentially monitor thousands of separate variables for each server. In one embodiment of the present invention, we then feed pairwise combinations of the corresponding signals into a large SPRT manifold that differences the corresponding signals and applies a "Wald test" to a cumulative sum of the differenced values. For all signals that exhibit dynamic patterns that are identical (in the statistical sense) between the golden system and the test system, the corresponding SPRT tests will continuously return "OK" decisions. However, any anomaly between the golden system and the test system variables will trigger an alarm. Moreover, because of the "Wald criteria" that is used for designing the SPRT modules, this test will have the shortest possible sampling time for making a decision with a given (pre-specified) level of confidence.

For servers in customer datacenters, it can be a huge inconvenience to bring the customer's server back to a service center for the purpose of root causing NTF events. It would be far better if the source of the NTF events can be root caused on site, thereby entailing minimal disruption to the customer's operations. For high-end servers (which can weigh greater than one ton), it is also not convenient to take a "golden system" server to the customer's datacenter. Consequently, in a second case, we set up the golden system to have the same hardware configuration as the customer's server. We can then install the telemetry harness and launch a deterministic workload as described above. However, in this second case we archive all of the telemetry signals into a database that can then be captured on a CD or other convenient medium. We then go to the customer's datacenter and install the same telemetry harness (which is entirely in software, requiring no hardware modifications to the customer's system). The same deterministic workload script is launched, and the archived signals from the golden system are fed from the storage medium along with the real-time telemetry signals from the customer's suspect system into the SPRT Manifold system. As before, the SPRT Manifold performs pair-wise differencing to identify the absence of a mechanism on the golden system that appears on the customer's suspect system.

Additional details of the above-described testing procedure are provided below with reference to FIGS. 1 and 2.

Golden System and Test System

FIG. 1 illustrates a golden system 104 and a test system 106 in accordance with an embodiment of the present invention. In the embodiment illustrated in FIG. 1, golden system 104 and test system 106 are server computer systems. Note that the golden system 104 has been subjected to extensive qualification testing and is presumed to be operating correctly. Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

As is illustrated in FIG. 1, golden system 104 and test system 106 include a number of system components. In one embodiment of the present invention, these system components are field replaceable units (FRUs), which can be independently monitored as is described below. Note that all major system units, including both hardware and software, can be decomposed into FRUs. (For example, a software FRU can include, an operating system, a middleware component, a database, or an application.)

The same deterministic load 102 is applied to both golden system 104 and test system 106. Next, measurements of performance parameters are taken while golden system 104 and test system 106 execute a deterministic load profile 102.

Note that these performance parameters can include physical performance parameters measured through sensors the computer system. For example, the physical parameters can include distributed temperatures within the computer system, relative humidity, cumulative or differential vibrations within the computer system, fan speed, acoustic signals, current noise, voltage noise, time-domain reflectometry (TDR) readings, and miscellaneous environmental variables.

These performance parameters can also include internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

As is illustrated in FIG. 1, signals containing measurements of performance parameters from golden system 104 and test system 106 feed into difference function generator 108. Note that difference function generator 108 typically resides within a computer system, which is located in close proximity to golden system 104 and test system 106. Alternatively, difference function generator 108 can located at a remote monitoring center.

Difference function generator 108 produces a number of residual functions 110 that feed into a component that performs a Sequential Probability Ratio Test (SPRT) 112. If patterns of dynamic system parameters remain statistically identical between the golden system 104 and the test system 106, SPRT module 112 generates an OK signal. Otherwise, SPRT module 112 triggers an alarm.

Note that the Sequential Probability Ratio Test is only one possible change detection technique that can be used with the present invention. In general, other types of change detection techniques, including other types of sequential detection methods can be used with the present invention.

In one embodiment of the present invention, golden system 104 and the test system 106 reside at the same location, and the deterministic load 102 is synchronized to execute concurrently on the golden system 104 and the test system 106.

In an alternative embodiment, golden system 104 and test system 106 reside at different locations, and the deterministic load 102 is first executed on the golden system 104 and the test results are recorded. At a later time, this allows the recorded signals from the golden system 104 to be compared against signals received from the test system 106, while test system 106 is running the same deterministic load 102.

Testing Process

Figure 2:
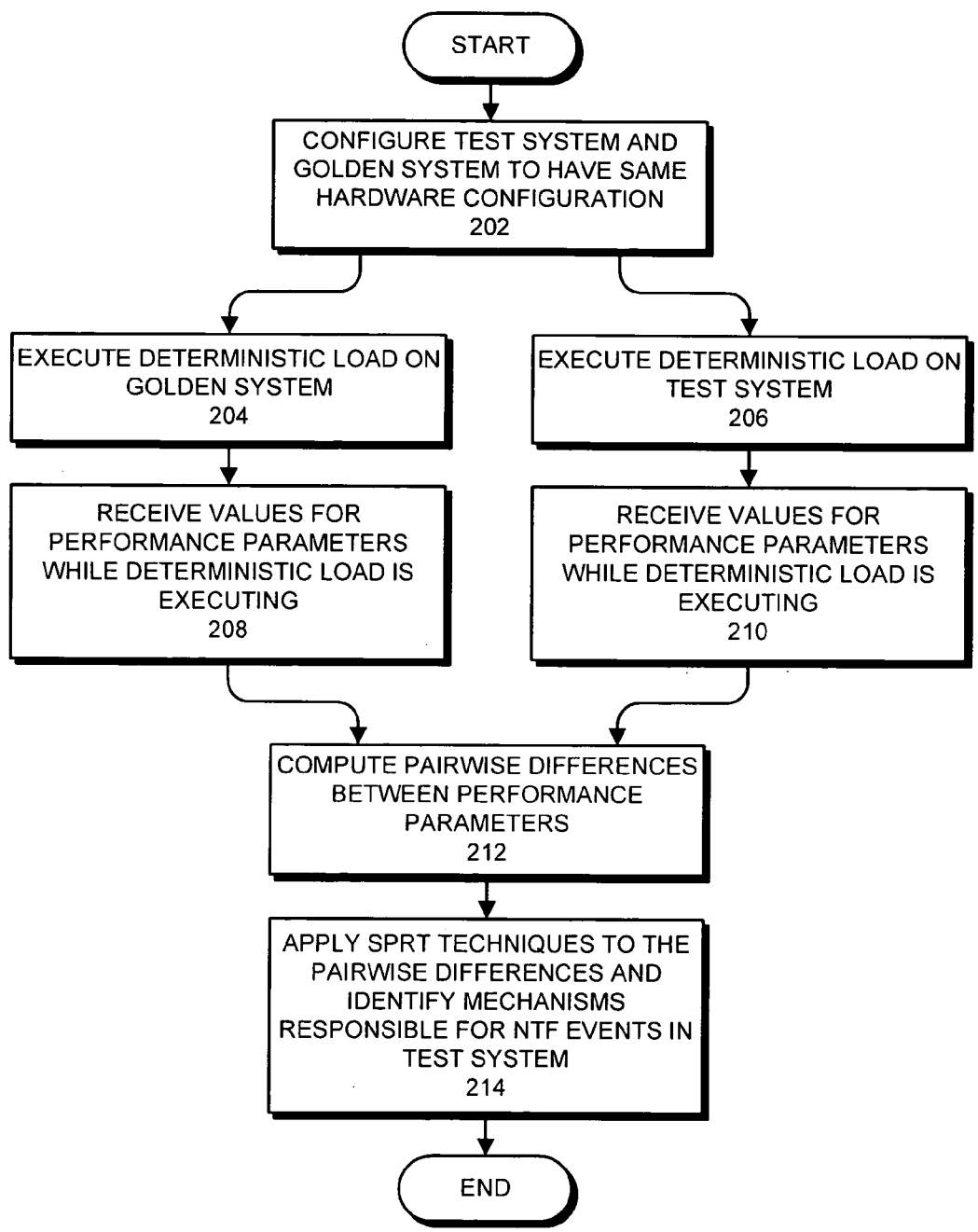
FIG. 2 presents a flow chart of the testing process in accordance with an embodiment of the present invention.

FIG. 2 presents a flow chart of the testing process in accordance with an embodiment of the present invention. First, the golden system 104 and the test system 106 are configured to have exactly the same hardware configuration (step 202). Next, the same deterministic load 102 is executed on both the golden system 104 and the test system 106 possibly at the same time or possibly at different times (steps 204 and 206). This causes values for the performance parameters to be received from both the golden system 104 and the test system 106 (steps 208 and 210). Note that if the systems execute at different times, the parameter values can be recorded.

Next, the system computes pairwise differences between the measured values for the performance parameters (step 212), and then uses the SPRT technique (or some other type of change detection technique) to identify mechanisms responsible for NTF events (step 214). This can involve correlating NTF events with deviations in patterns of performance parameters between the golden system 104 and the test system 106. These correlations can be used to make associations between the causes of parameter deviations and the NTF events.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting anomalies during operation of a test system, comprising:
   configuring a golden system and the test system to have the same hardware configuration, wherein the golden system has gone through extensive qualification testing and is presumed to be operating correctly;
   executing a deterministic load on the golden system;
   receiving values for performance parameters from the golden system while the deterministic load is executing;
   executing the deterministic load on the test system;
   receiving values for performance parameters from the test system while the deterministic load is executing;
   computing pairwise differences between values for performance parameters received from the test system and values for performance parameters received from the golden system; and
   applying change detection techniques to the pairwise differences to detect anomalies during operation of the test system, wherein detecting the anomalies involves identifying mechanisms responsible for "no-trouble-found" (NTF) events in the test system.

2. The method of claim 1, wherein the change detection techniques include sequential detection methods.

3. The method of claim 2, wherein the sequential detection methods include the Sequential Probability Ratio Test (SPRT).

4. The method of claim 1,
   wherein the golden system and the test system reside at the same location; and wherein the deterministic load is synchronized to execute concurrently on the golden system and the test system.

5. The method of claim 1,
wherein values for performance parameters received from the golden system are recorded; and
wherein computing the pairwise differences involves computing pairwise differences between values for performance parameters received from the test system and recorded values for performance parameters from the golden system.

6. The method of claim 5,
wherein values for performance parameters received from the test system are also recorded; and
wherein computing the pairwise differences involves computing pairwise differences between recorded values for performance parameters received from the test system and recorded values for performance parameters from the golden system.

7. The method of claim 5, wherein the golden system and the test system do not reside at the same location.

8. The method of claim 5, wherein the deterministic load is executed on the golden system first before the deterministic load is executed on the test system.

9. The method of claim 1, wherein the performance parameters for the test system and the golden system can include:
   internal performance parameters maintained by software within the test system and the golden system;
   physical performance parameters measured through sensors located in proximity to the test system and the golden system; and
   canary performance parameters associated with synthetic user transactions periodically generated for performance measuring purposes.

10. An apparatus for detecting anomalies during operation of a test system, comprising:
   a golden system that is configured to have the same hardware configuration as the test system, wherein the golden system has gone through extensive qualification testing and is presumed to be operating correctly;
   a testing mechanism for the golden system which is configured to,
      execute a deterministic load on the golden system, and to
      receive values for performance parameters from the golden system while the deterministic load is executing;
   a testing mechanism for the test system which is configured to,
      execute the deterministic load on the test system, and to
      receive values for performance parameters from the test system while the deterministic load is executing;
   a differencing mechanism configured to compute pairwise differences between values for performance parameters received from the test system and values for performance parameters received from the golden system; and
   a detection mechanism configured to apply change detection techniques to the pairwise differences to detect anomalies during operation of the test system, wherein the detection mechanism is configured to identify mechanisms responsible for "no-trouble-found" (NTF) events in the test system.

11. The apparatus of claim 10, wherein the change detection techniques include sequential detection methods.

12. The apparatus of claim 11, wherein the sequential detection methods include the Sequential Probability Ratio Test (SPRT).

13. The apparatus of claim 10,
wherein the golden system and the test system reside at the same location; and
wherein the testing mechanism for the golden system and the testing mechanism for the test system are configured to synchronize execution of the deterministic load on the golden system and the test system.

14. The apparatus of claim 10,
wherein the testing mechanism for the golden system is configured to record values for performance parameters received from the golden system; and
wherein the differencing mechanism is configured to compute pairwise differences between values for performance parameters received from the test system and recorded values for performance parameters from the golden system.

15. The apparatus of claim 14,
wherein the testing mechanism for the test system is configured to record values for performance parameters received from the test system; and
wherein the differencing mechanism is configured to compute pairwise differences between recorded values for performance parameters received from the test system and recorded values for performance parameters from the golden system.

16. The apparatus of claim 14, wherein the golden system and the test system do not reside at the same location.

17. The apparatus of claim 14, wherein the testing mechanism for the golden system and the testing mechanism for the test system are configured to execute the deterministic load on the golden system first before the deterministic load is executed on the test system.

18. The apparatus of claim 10, wherein the performance parameters for the test system and the golden system can include:
   internal performance parameters maintained by software within the test system and the golden system;
   physical performance parameters measured through sensors located in proximity to the test system and the golden system; and
   canary performance parameters associated with synthetic user transactions periodically generated for performance measuring purposes.

19. A computer-readable storage medium storing instructions that when executed by a computer cause the computer to perform a method for detecting anomalies during operation of a test system, wherein the method operates on a golden system and the test system that are configured to have the same hardware configuration, wherein the golden system has gone through extensive qualification testing and is presumed to be operating correctly, wherein the computer-readable storage medium includes magnetic and optical storage devices, disk drives, magnetic tape, CDs (compact discs), and DVDs (digital versatile discs or digital video discs), and wherein the method comprises:
   executing a deterministic load on the golden system;
   receiving values for performance parameters from the golden system while the deterministic load is executing;
   executing the deterministic load on the test system;
   receiving values for performance parameters from the test system while the deterministic load is executing;

computing pairwise differences between values for performance parameters received from the test system and values for performance parameters received from the golden system; and applying change detection techniques to the pairwise differences to detect anomalies during operation of the test system, wherein detecting the anomalies involves identifying mechanisms responsible for "no-trouble-found" (NTF) events in the test system.

20. The computer-readable storage medium of claim 19, wherein the change detection techniques include sequential detection methods.

21. The computer-readable storage medium of claim 20, wherein the sequential detection methods include the Sequential Probability Ratio Test (SPRT).

* * * * *